United States Patent Office 3,414,868
Patented Dec. 3, 1968

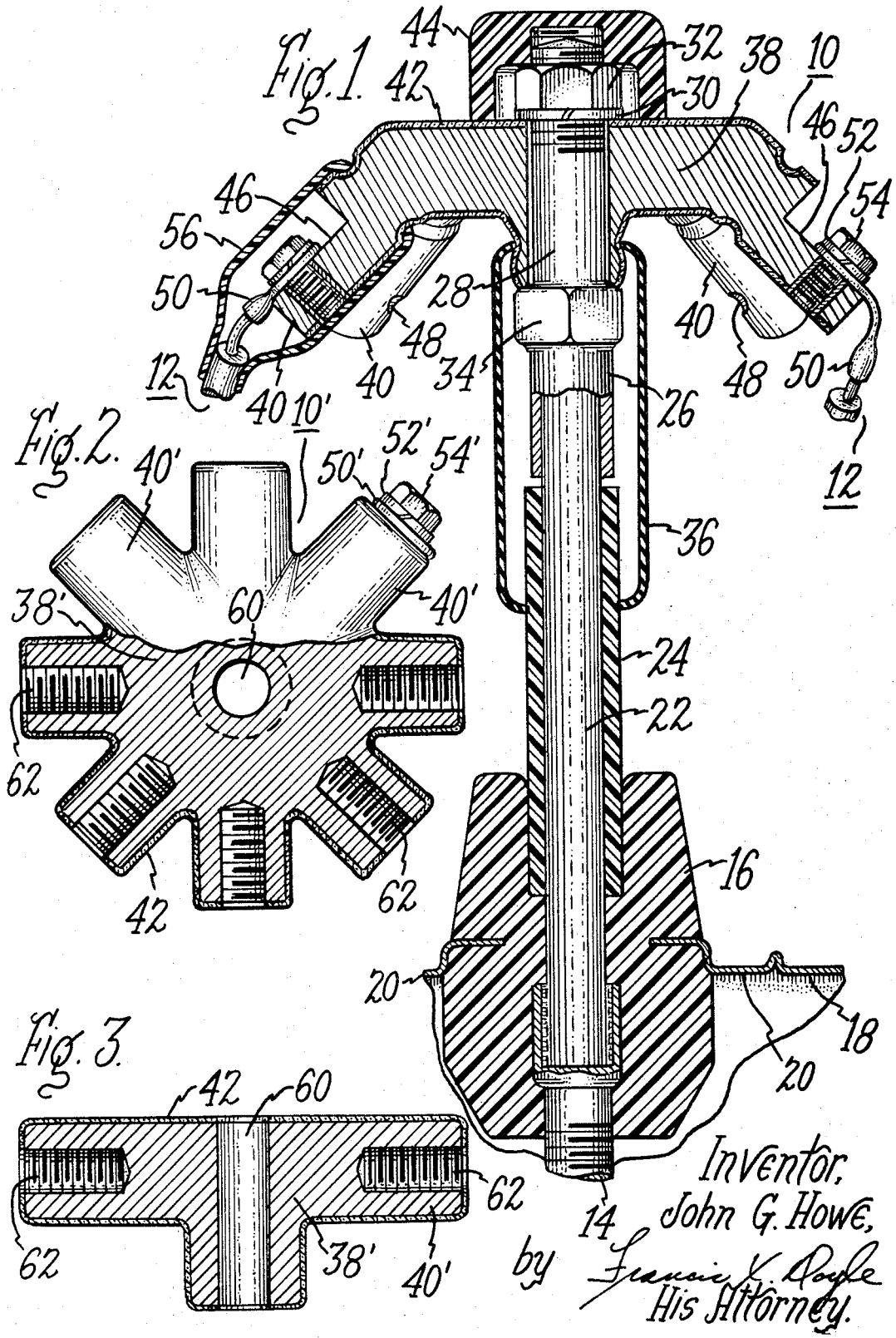

3,414,868
TERMINATOR FOR CONNECTING A PLURALITY OF ELECTRICAL CABLES TO A SECONDARY OF AN ELECTRICAL APPARATUS
John G. Howe, Baltimore, Md., assignor to General Electric Company, a corporation of New York
Filed May 10, 1967, Ser. No. 637,436
2 Claims. (Cl. 339—116)

ABSTRACT OF THE DISCLOSURE

A terminator for connecting a plurality of secondary cables to the secondary lead of an electrical apparatus. The terminator is a metallic member having a central opening for connecting it mechanically and electrically to a secondary lead from an electrical apparatus. The terminator is provided with a plurality of finger members extending radially from the central portion of the terminator, each finger having a tapped hole for connecting a secondary cable mechanically and electrically to such finger. The central portion of the terminator and each finger is coated with electrical insulation. Sealing means in the form of rubber sleeves are also provided to seal each cable connection to each finger.

Background of invention

This invention relates to terminators for electrical apparatus and more particularly, to terminators for connecting a plurality of electrical cables to the secondary lead from an electrical apparatus.

As is well known to those skilled in the electrical distribution field, there is presently a growing trend from overhead, open wire electrical distribution to underground, buried wire distribution. In some forms of buried wire distribution, the distribution transformer is installed underground, usually in a lined hole which is provided with a grate to provide ventilation for the transformer. In this type of buried distribution, a single transformer usually provides the electrical energy for a number of houses. Thus, it is necessary that means be provided to connect a plurality of secondary leads to the secondary of the transformer. Various devices have been proposed to provide such connections, such devices being referred to as connectors or terminators. The term terminator is used herein to denote a device for terminating the secondary cables and connecting them to the secondary of a distribution transformer.

It has been proposed that a secondary terminal device be provided in the form of a separate housing either in the hole with the transformer or else in a separate location. The terminal device is connected to the secondary of the transformer. These secondary terminal devices provide for means within the housing to connect a plurality of secondary leads to the secondary of the transformer. However, the size and expense of these devices increase the cost of underground distribution, which, as is well understood, is already more costly then comparable overhead distribution. Thus, it is believed by those skilled in the art that these separate secondary terminal devices are too costly for general use in underground distribution. Further, the use of such secondary devices in separate holes is also considered impractical due to the increases in cost.

As is well known, transformers installed in holes are subject to submersion during rainy weather. This requires that all connections to the transformer, including the attachments of the secondary cables, be watertight. From the above, it is apparent that there is a need in the underground distribution field, for a secondary terminal means to allow termination or connection of the various secondary cables to a distribution transformer in a watertight manner. It is also apparent that it is required that secondary terminators be as inexpensive as possible and also be relatively simple to use.

It is therefore one object of this invention to provide a terminator for a distribution transformer to allow for connecting of a plurality of secondary cables to the secondary of such transformer.

A further object is to provide a terminator which is inexpensive and easily used by linemen in the field.

A further object is to provide a terminator which will enable watertight secondary connections to such terminators.

Summary of invention

In carrying out this invention in one form, a metallic terminator is provided having a central portion for connection to the secondary of a distribution transformer. A plurality of fingers, integral with the body member, extend radially from the central portion, with each finger being provided with means to secure a secondary cable to such finger. Sealing means are provided which will seal each secondary cable to a finger to provide a watertight connection.

The invention which is sought to be protected will be particularly pointed out and distinctly claimed in the claims appended hereto. However, it is believed that this invention, and the manner in which its various objects and advantages are obtained, as well as other objects and advantages thereof, will be better understood by reference to the following detailed description of preferred embodiments of the invention, particularly when taken in connection with the accompanying drawing.

Brief description of drawings

FIGURE 1 is a sectional view of one form of terminator according to this invention showing a preferred method of securing the terminator to the secondary lead of an electrical apparatus;

FIGURE 2 is a top view partly in section showing another form of terminator according to this invention; and FIGURE 3 is a cross sectional view of the form of terminator shown in FIGURE 2.

Description of preferred embodiments

This invention relates to terminators for electrical distribution in which a plurality of secondary electrical distribution cables are connected to the secondary of a distribution transformer. Sealing means are provided to seal the secondary cables to the terminator to provide a watertight connection. In the preferred embodiments described herein, there is set forth the particular construction believed most suitable for achieving the various objects and advantages of this invention. However, it will be apparent that changes may be made in certain specific details without departing from the scope of the defined invention.

Referring now to the drawings in which like numerals are used to indicate like parts throughout the various views, and referring particularly to FIGURE 1, there is shown one form of terminator 10 according to this invention, which terminates secondary cables 12 and connects the secondary cables 12 to a secondary stud 14 of a distribution transformer (not shown). As shown in FIGURE 1, a secondary stud 14 extends from the interior of a transformer (not shown) to a secondary bushing 16 which is mounted on the cover 18 of the transformer by means of a flange 20, preferably welded to cover 18. A secondary flexible lead 22 is secured to stud 14 in the bushing 16 in any desired manner such as, for example, by brazing. The flexible lead 22 extends from the bushing 16, as shown, above the cover 18 of the transformer. The secondary lead 22 is provided with insulation 24 and may extend to any desired length. The upper end of secondary lead 22 is secured to a threaded compression stud 26 to provide means for securing the terminator 10 to secondary lead 22. As will be understood, compression stud 26 may be crimped or otherwise secured to cable 22 and is provided with a threaded portion 28 which extends through an opening in the terminator 10, as shown. A spring washer 30 and nut 32 are threaded on the portion 28 to firmly secure terminator 10 to lead 22. In the form shown in FIGURE 1, a shoulder portion 34 is provided, against which the terminator 10 rests and against which terminator 10 is secured, by means of nut 32 and spring washer 30, as will be apparent. The shoulder 34 may also be used to hold stud 26 while the nut 32 is being tightened on threaded portion 28. An insulated sleeve or cover member 36 is provided to seal stud 26 to the terminator 10, as indicated. Of course, it will be obvious that other connecting means may be used if desired.

In the terminator embodiment shown in FIGURE 1, the terminator 10 is a metallic member, preferably copper or other highly electrically conducting member, having a main body portion 38 with a plurality of integral finger members 40 extending radially from the body portion 38. The exterior of terminator 10 is covered with an electrical insulating material 42. In the preferred embodiment, a resinous insulating material is coated on the surface of the terminator 10, for example, in a fluid bed operation. Further, an electrically insulating cap 44 is provided, which screws onto the threaded portion 28 of stud 26. Each finger 40 extends at an angle of approximately 45° from the plane of the upper surface of body portion 38, as shown. Each finger 40 is provided with a flat shelf portion 46 which extends over most of the finger portion, as shown in FIGURE 1. A hole 48 is drilled and tapped in each shelf portion 46 for securing a secondary cable 12 to the finger 40.

As shown in FIGURE 1, a secondary cable 12 is provided with a crimped connector 50. The crimped connector 50 is secured to finger 40 preferably by means of a spring washer 52 and a bolt 54, the bolt being threaded into the hole 48. As will be apparent, secondary cable 12 will be electrically connected to secondary stud 14 through the terminator 10 and the secondary lead 22. Obviously, as many cables 12 as desired, with the limits of the number of fingers 40, may be connected by means of terminator 10 to the secondary stud 14.

In order to make the connection of cable 12 to finger 40 watertight, a rubber sealing sleeve 56 is provided. Sleeve 56 may be mounted over cable 12 and after the connection of connector 50 to finger 40 by bolt 54, the sleeve 56 may be drawn over the connector with one end about the insulation 58 on cable 12 and the other end about the innermost portion of finger 40, as shown. Of course, it should also be understood that the rubber sleeves 56 may be mounted on the fingers 40 and after the connection is made, the rubber sleeve may be drawn over the connection and onto the insulation of the cable 12. Of course, it will be understood that rubber caps can be provided over any fingers 40 which are not used, such caps sealing and protecting the fingers while not in use.

FIGURES 2 and 3 show a second embodiment of the terminator of this invention. In referring to FIGURES 2 and 3, parts which are similar to those of FIGURE 1 will be indicated by a prime numeral. As can be seen from FIGURES 2 and 3, the terminator 10' is a metallic body member such as for example, copper, and has a central portion 38' and a plurality of integral fingers 40 extending radially from the central portion 38'. A central opening 60 is provided in the central portion 38' for securing the terminator 10' to a secondary lead, for example in the manner shown in FIGURE 1. However, as shown in FIGURES 2 and 3, the fingers 40' have holes 62 drilled and tapped along the length of the fingers 40'. Also, the fingers 40' are substantially in the same plane as the top of terminator 10', rather than being at an acute angle, as is shown in FIGURE 1. A secondary cable may be secured to each of fingers 40' by means of a crimp connector 50', a spring washer 52' and bolt 54' as is shown, for example in FIGURE 2.

The outer surface of terminator 10' is coated with an insulating material in the same manner as the terminator 10. This insulating material is indicated as 42 in FIGURES 2 and 3. Obviously, the connection to fingers 40' may be sealed by a rubber sleeve, although an elbow shaped sleeve would be necessary for the type of connection shown in FIGURE 2. Also, a cap similar to cap 44 may be provided for sealing the top of the terminator 10', in a similar manner as previously described with reference to FIGURE 1. Sealing caps may also be provided over those fingers 40' which are not in use, to seal such finger and protect it.

From the above description it will be readily apparent that the terminator of this invention may be readily secured to the secondary of a transformer. Further, as will be apparent, all of the secondary cables may be readily removed by removing the terminator from the stud connected to the secondary cable serving a single house may be readily removed if desired, without in any manner disturbing any of the other secondary connections. From the above description it will be apparent that by means of this invention, there is provided a terminator which is inexpensive, easy to use and is provided with watertight connections. While there has been shown and described, the present preferred embodiment of this invention, it will be obvious to those skilled in the art that various constructional changes may be made in the specific detail set forth without departing from the spirit and scope of the invention, particularly as it is defined in the appended claims.

What is claimed as new and which it is desired to secure by Letters Patent of the United States is:

1. A terminator comprising:
    (a) a central body portion of metallic material;
    (b) a plurality of fingers integral with said body portion and extending radially therefrom;
        (1) each said finger extending downward at an acute angle from the plane of the upper surface of said central body portion,
        (2) each said finger provided with a cut out portion to form a flattened shelf portion,
            (i) said flattened shelf portion having a tapped hole for receiving a threaded screw for securing a secondary cable to said finger,
            (ii) said cut out portion providing space for the head of said threaded screw on said shelf portion;
    (c) sealing means in the form of rubber sleeves for sealing each connection to each of said fingers;
    (d) and electrical insulating material coated on the exposed surface of said central body portion and said plurality of fingers.

2. A terminator as claimed in claim 1, in which said central body portion has an opening for connection to a distribution lead.

References Cited

UNITED STATES PATENTS

| 1,043,321 | 11/1912 | Knutz | 174—145 |
| 2,038,436 | 4/1936 | Mangin | 339—13 X |
| 2,087,384 | 7/1937 | Lee | 174—72 |
| 3,173,988 | 3/1965 | Martahus et al. | 174—75 |
| 3,243,764 | 3/1966 | McGrane et al. | 339—242 |
| 3,344,382 | 9/1967 | Olive et al. | 174—75 |

RICHARD E. MOORE, *Primary Examiner.*

UNITED STATES PATENT OFFICE
CERTIFICATE OF CORRECTION

Patent No. 3,414,868                  December 3, 1968

John G. Howe

It is certified that error appears in the above identified patent and that said Letters Patent are hereby corrected as shown below:

Column 3, line 45, after "with" insert -- in --. Column 4, line 24, after "removed" insert -- merely --; line 25, after "secondary" insert -- lead. Also, as will be apparent, at any time, any particular secondary --.

Signed and sealed this 10th day of March 1970.

(SEAL)
Attest:

Edward M. Fletcher, Jr.

Attesting Officer

WILLIAM E. SCHUYLER, JR.
Commissioner of Patents